May 2, 1961  J. J. HANNAFIN  2,982,194
HORIZONTAL RELEASE FOR CAMERAS
Filed July 15, 1960

INVENTOR.
JEROME J. HANNAFIN
BY
Salvatore G. Militana
attorney 2,982,194
HORIZONTAL RELEASE FOR CAMERAS
Jerome J. Hannafin, 244 NW. 48th Court, Miami, Fla.
Filed July 15, 1960, Ser. No. 43,174
7 Claims. (Cl. 95—53)

This invention relates generally to photographic cameras and is more particularly directed to a horizontal release mechanism for cameras.

A principal object of the present invention is to provide a camera with a horizontal release mechanism which is readily actuated when taking pictures without the danger of causing any movement of the camera.

Another object of the present invention is to provide a camera with a horizontal release mechanism that is actuable by a push or pull with one's thumb or forefinger wherein the force applied will not cause the camera to move or be jarred at the time of taking a picture.

Another object of the present invention is to provide a camera with a release mechanism that is actuated by a squeezing method similar to that used in the firing of a gun so that the camera will not be shifted at the taking of a picture.

Still another object of the present invention is to provide a camera with a horizontal release which is readily adaptable as an attachment to the present cameras or may be incorporated in the manufacture of the cameras without making any major changes or incurring a high cost.

A still further object of the present invention is to provide a horizontal release for cameras which returns automatically to its neutral position after being actuated and which permits the use of a cable release device for time exposures.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

Figure 1:
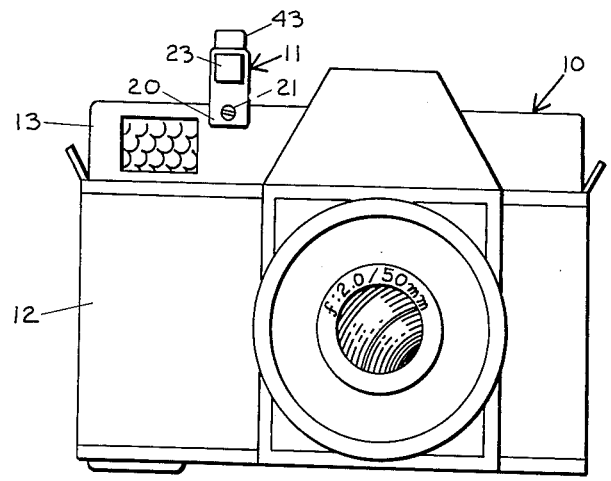
Figure 1 is a front elevational view of a camera on which a horizontal release mechanism has been mounted.
Figure 2:
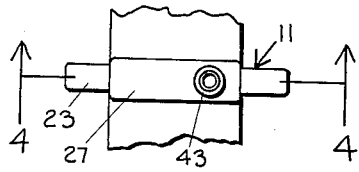
Figure 2 is a fragmentary top plan view of the camera.
Figure 3:
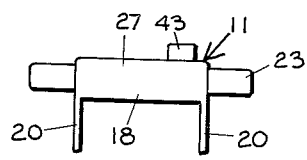
Figure 3 is a side elevational view of the horizontal release mechanism as seen removed from the camera.
Figure 6:
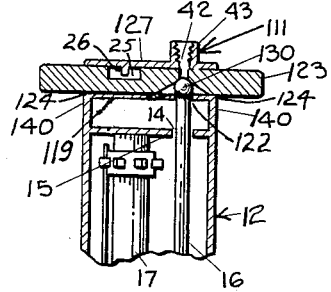
Figure 6 is a cross sectional view similar to Figure 4 showing a modified horizontal release mechanism mounted within the casing of the camera.
Figure 7:
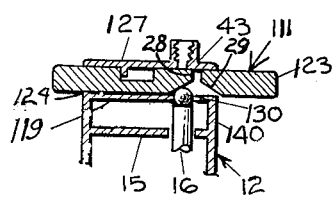
Figure 7 shows the operation of the mechanism shown in Figure 6.
Figure 8:
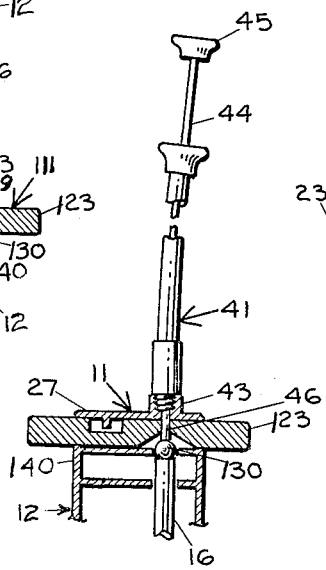
Figure 8 is a cross sectional view showing the manner of attachment of the release cable.

Referring to the drawing wherein like numerals are used to designate similar parts throughout the several views, the numeral 10 refers to a conventional camera on which my horizontal release mechanism 11 has been mounted; as shown by Figures 1–5 inclusive my horizontal release mechanism 11 is mounted as an attachment or accessory to the camera 10 while Figures 6–8 inclusive show my horizontal release mechanism 111 constructed as an original part of the camera. However, both of the horizontal release mechanisms 11 and 111 are substantially identical in construction and in their operation to actuate the shutter release during the taking of a picture, the sole differences of structure being in the manner of mounting thereof.

The camera 10 consists of the usual main casing 12 on which is mounted a substantially U-shaped end wall casing 13 in which are contained the operating mechanisms of the camera 10. Extending through a bore 14 of a top wall 15 of the casing 13 is a release rod 16 which is actuated to release a previously tensioned shutter when taking a picture. Since the elements of structure discussed hereinabove are conventional and form no part of the invention, they are not shown nor described in detail. In the conventional camera there is a release lever mounted on the casing 13 and operatively connected to the release rod 16 for taking a picture. This release lever which must be swung to describe an arc in order to actuate the release rod 16 has been substituted by applicant's horizontal release mechanism 11 which requires only a push with a thumb or forefinger for taking a picture. Adjacent to the release rod 16 is a conventional film take-up spool 17.

In my horizontal release device 11, there is provided a substantially rectangular shaped casing 18 with a bottom wall 19 and a pair of downwardly depending tabs 20 which engage the front and rear wall of the main casing 12. Screws 21 extending through the tabs 20 and the casing 12 secure my release device 11 to the camera 10.

Figure 4:
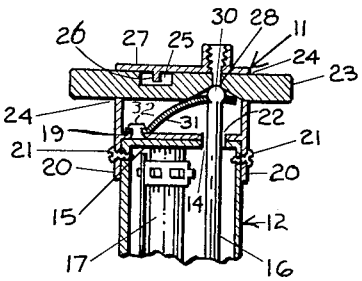
Figure 4 is a fragmentary cross sectional view taken along the line 4—4 of Figure 2.

Aligned with the bore 14 in the top wall 15 of the casing 13 is a bore 22 in the wall 19 to permit the upper end portion of the release rod 16 to extend therethrough as shown by Figure 4. The extreme upper end of the release rod 16 terminates in close proximity to a reciprocable member 23 that is slidably mounted in the casing 18 with end portions that extend through openings 24, 24 in the casing 18. The reciprocable member 23 is non-circular in order to prevent rotation thereof and is here shown rectangular in cross section although any other non-circular shape may be utilized. In order to limit the sliding movement of the reciprocable member 23 there is provided a notch or slot 25 in which is positioned a depending finger or member 26 secured to a top wall 27 of the casing 18.

When the reciprocable member 23 is in its neutral or mid-position a bore 28 in the reciprocable member 23 will be in axial alignment with the release rod 16. The bore 28 is substantially cylindrical for approximately half the thickness of the member 23 and then its side walls taper away from each other as at 29 to form an enlarged conical opening to receive a ball bearing 30. The ball bearing 30 is maintained in position within the confines of the opening 29 by one end of a leaf spring 31 whose other end extends downwardly to the end wall 19 where it is secured as by a rivet 32. The leaf spring 31 is provided with a bore 33 which acts as a seat for the ball bearing 30.

Figure 5:
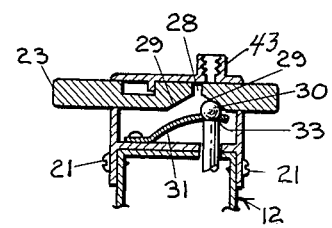
Figure 5 is a similar view with the horizontal release mechanism shown in its actuated position.

It can readily be seen that upon applying pressure either with one's thumb or forefinger at either end of the reciprocable member 23, the reciprocable member 23 will slide as shown by Figure 5. The tapered wall 29 of the bore 28 will cause the ball bearing to move downwardly against the spring pressure 31 to effect a downward sliding movement of the release rod 16 thereby actuating the shutter of the camera 10 and taking a picture. The depending stop member 26 will abut against the end wall of the slot 25 and prevent any further sliding movement of the reciprocable member 23. After the noise of the clicking shutter is heard, the person will release the force he has applied on the reciprocable member 23 and remove his thumb or finger therefrom. The upward force of the leaf spring 31 against the ball bearing 30 will be transmitted by the ball bearing 30 against the inclined or tapered surface 29 to cause the reciprocable member 23 to slide back to its normal or mid-position as shown by Figure 4. The reciprocable member 23 is again in position to be actuated as previously described for releasing the release rod 16 in the taking of pictures.

In Figures 6–8 inclusive, I show an alternate construction 111 of my device which I find to be preferable of the two constructions. Although this horizontal release device 111 is shown mounted as an integral construction with the camera 10, it can also be utilized as an attachment to the camera in the same manner as the previously described horizontal release 11 since the actuation and operation thereof is the same. The horizontal release device 111 consists of a rectangular shaped casing having a top wall 127 and bottom wall 119 with front and rear wall 140 of the casing 12 in which are found openings 124. A reciprocable member 123 is slidably mounted within the casing and extending through and beyond the openings 124 in approximate contact relation with the walls 119 and 127. The reciprocable member 123 is constructed identically with the member 23 having an opening 28 and an outwardly tapered opening 29 communicating therewith and a slot 25 in which a stop member 26 extends. The depending stop member 26 is secured to the top wall 127 and limits the sliding movement of the reciprocable member 123. In the camera 10, the release rod 16 extends through the opening 14 in the wall 15 and terminates at an opening 122 in the wall 119. Positioned on the end of the release rod 16 is the ball bearing 130 which engages the tapered walls 29 and extends within the bore 122 below the bottom wall 119 so that the diameter of the ball 130 is greater than the vertical height of the tapered walls 29. In other words, the ball 130 is larger than the opening formed by the tapered walls 29 whereby the lower portion of the ball 130 extends below a plane passing through the bottom wall 119.

When a force is applied by one's thumb or forefinger against either end of the reciprocable member 123, the latter will slide in the direction the member 123 has been pushed. The tapered walls 29 will force the ball 130 downward since it cannot roll longitudinally out of the opening 122, and thereby cause the depression of the release rod 16 to effect the operation of the camera shutter. The stop 26 will abut against the end wall of the slot 25 and prevent any further movement as shown by Figure 7. When the reciprocable member 123 is released, the release rod 16, being under spring pressure (not shown) will exert an upward force on the ball bearing 130 which in turn bears upwardly against the tapered walls 29 to force the reciprocable member 123 back to its neutral position ready to be actuated in the taking of another snapshot with the camera 10.

In order to permit the use of a conventional release cable 41 for time exposure pictures in connection with my release device 11 or 111, the top wall 27 (127) is provided with a bore 42 which is in alignment with the bore 28 when the reciprocable member 23 is in its neutral or mid-position. Mounted on the top wall 27 about the bore 42 is a collar 43 provided with threads for receiving the threaded portion of the release cable 41 so that the trip rod 46 of the actuating cable 44 will engage the ball 130 (30) as shown by Figure 8. At the other end of the actuating cable 44 is a thumb piece 45 which when actuated in the conventional manner will cause the cable 44 to slide the pin 46 downwardly forcing the ball 130 (30) and the release rod 16 to move downwardly to actuate the shutter of the camera 10.

What I claim as new and desire to secure by Letters Patent of the United States is:

1. A horizontal release mechanism for a camera having a shutter release member, a housing, said housing having a pair of openings in alignment with said release member, an elongated slidable member mounted in said housing and extending through said openings, said elongated slidable member having a bore in axial alignment with said release member, said bore being flared outwardly increasing in diameter in the direction of said release member, rotatable means positioned in said flared bore member in alignment with said release member and in substantially contact relation whereby upon the sliding of said slidable member said flared bore causes the downward movement of said rotatable member against said release member to actuate said release member.

2. A horizontal release mechanism for a camera having a release member comprising an elongated slidable member having a bore in alignment with said release member, said bore being flared outwardly increasing in diameter in the direction of said release member, rotatable means positioned in said flared bore in alignment with said release member and in substantially contact relation whereby upon the sliding of said slidable member said flared bore causes the downward movement of said rotatable member against said release member to actuate said release member and a stop means mounted on said housing and coacting with said elongated slidable member for limiting the sliding movement of said slidable member.

3. A horizontal release mechanism for a camera having a shutter release rod, a housing having a top wall, a bottom wall and end walls, said end walls having openings in coplanar relationship with said shutter release rod and said bottom wall having a bore for receiving said release rod, an elongated slidable member mounted in said housing and extending through said openings, said elongated slidable member having a tapered bore in axial alignment with said shutter release rod, said tapered bore increasing in diameter in the direction of said release rod, ball means positioned in said flared bore resting on said bore in said bottom wall and in substantially contact relation with said walls of said tapered bore and said shutter release rod and stop means for limiting the sliding movement of said elongated slidable member whereby upon the sliding of said slidable member said ball means is forced downwardly against said shutter release rod to actuate said last named member.

4. A horizontal release mechanism for a camera having a release member comprising an elongated slidable member having a bore in alignment with said release member, said bore being flared outwardly increasing in diameter in the direction of said release member, rotatable means positioned in said flared bore in close proximity to said release member, and flexible means yieldingly maintaining said rotatable member in said flared bore and in alignment with said release member whereby upon the sliding of said slidable member said flared bore causes the movement of said rotatable member against the yielding force of said flexible member to actuate said release member.

5. A horizontal release mechanism for a camera having a shutter release member, a housing, said housing having a pair of openings in coplanar relationship with said release member, an elongated slidable member mounted in said housing and extending through said openings, said elongated slidable member having a bore in axial alignment with said release member, said bore being flared outwardly increasing in diameter in the direction of said release member, ball means positioned in said flared bore in close proximity to said release member, a leaf spring having one end secured to said housing and the other end yieldingly maintaining said ball means in said flared bore in alignment with said release member and stop means for limiting the sliding movement of said release member whereby upon the sliding of said slidable member said flared bore causes the movement of said rotatable member against the yielding force of said flexible member to actuate said release member and a threaded collar mounted on said housing in axial alignment with said bore for receiving a cable release device.

6. In a camera having a casing and a substantially vertically disposed release rod mounted in said casing, a horizontal release device comprising a housing, a depending tab mounted at each end of said housing, fastening means for securing said tabs to said casing in alignment with said release rod, said housing having an opening at each end, an actuating member slidably mounted in said housing and extending through said openings, said slidable actuating member having a bore in axial alignment with said release rod, said bore being flared outwardly increasing in diameter in the direction of said release rod, a ball positioned in said flared portion of said bore, a leaf spring having an opening adjacent one end, means securing the other end to said housing with said ball received by said opening in said leaf spring whereby said ball is yieldingly maintained in said flared bore adjacent the end of said release rod and upon the actuation of said slidable member, said flared surface of said bore effects the movement of said ball in the direction of said release rod to cause said release rod to slide in a direction away from said housing.

7. In a camera having a casing and a substantially vertically disposed release rod mounted in said casing, a horizontal release device comprising a housing, a depending tab mounted at each end of said housing, fastening means for securing said tabs to said casing in alignment with said release rod, said housing having an opening at each end, an actuating member slidably mounted in said housing and extending through said openings, said slidable actuating member having a bore in axial alignment with said release rod, said bore being flared outwardly increasing in diameter in the direction of said release rod, a ball positioned in said flared portion of said bore, a leaf spring having an opening adjacent one end, means securing the other end to said housing with said ball received by said opening in said leaf spring whereby said ball is yieldingly maintained in said flared bore adjacent the end of said release rod and upon the actuation of said slidable member, said flared surface of said bore effects the movement of said ball in the direction of said release rod to cause said release rod to slide in a direction away from said housing and a threaded collar mounted on said housing in axial alignment with said bore for receiving a cable release device.

References Cited in the file of this patent

UNITED STATES PATENTS 2,793,573    Cuchet _____ May 28, 1957